INVENTOR.
Hans Edvard Frederiksen
BY
Cushman, Donkey & Cushman
Attorneys

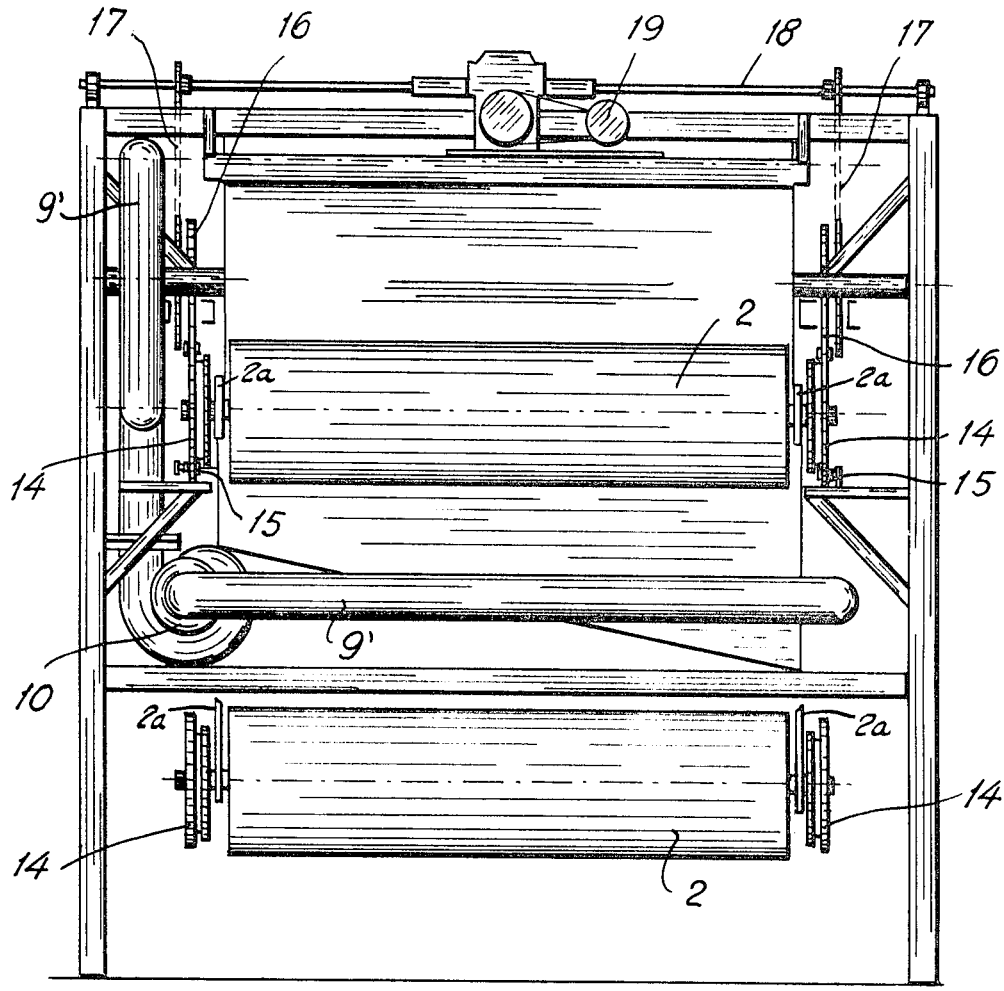
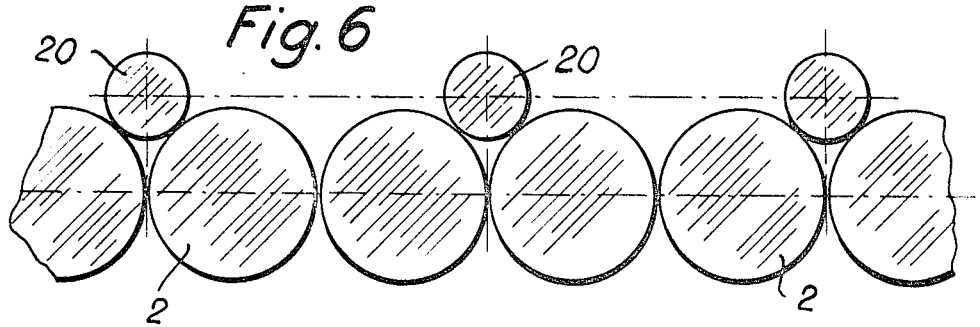

United States Patent Office
3,609,798
Patented Oct. 5, 1971

3,609,798
MACHINE FOR SCALDING PIG CARCASSES
Hans Edvard Frederiksen, 137 Islevdalvej,
2610 Rodovre, Denmark
Filed Feb. 4, 1969, Ser. No. 796,403
Claims priority, application Denmark, Feb. 7, 1968, 422/68
Int. Cl. A22b 5/08
U.S. Cl. 17—15     3 Claims

ABSTRACT OF THE DISCLOSURE

Scalding machine for treating the skin and the hairs of a pig carcass prior to removing the hairs in a following machine, the said scalding operation being performed while the carcass is moved in its lying position, preferably rotating about its longitudinal axis, along a path through the air, the carcass being showered with hot water, by which immersion of the pig carcass into water with consequent penetration of infected water into the lungs and other cavities is avoided.

BACKGROUND OF THE INVENTION

Usually, the hairs on pig carcasses are removed by means of suitable machines, for example scraping machines, and to facilitate this work the surface of the carcass is subjected to prior scalding, that is, a treatment with hot water having a temperature of about 60° C.

Practice hitherto has been put to the pig carcasses into a vessel with scalding water and to move them for a certain time in the vessel before transferring them to a hair removing device. This method has the serious drawback that water gets into the lungs of the pigs, thereby deteriorating the value of the lungs essentially.

To relieve the said drawback it has been proposed to carry out the scalding while the pig carcasses are in their suspended position such as they are normally passed through the bacon factory, that is, suspended by one hind leg, in which vertical position they are transported by means of a horizontal conveyor. The pig carcasses are then subjected to jets of water from the side where there are mounted showering means. This method has for various reasons been found unsatisfactory. Thus, the two hind legs are not uniformly scalded, and when salted one ham may therefore vary in colour from that of the other one, which is undesired. Furthermore, the heat to which the hair follicles are subjected is not adequately uniform over the area of the skin.

It is the object of the present invention to provide a machine for scalding pig carcasses; the said machine works on an entirely novel principle by which injury to the lungs is avoided, simultaneously with a very effective scalding of the surface of the pig carcass and all the hair follicles being obtained.

SUMMARY OF THE INVENTION

An essential feature of the machine according to the invention is that it has conveyor means adapted to carry and advance the pig carcasses in their lying position along a path in the air along which there are mounted nozzles, each adapted to direct a jet of hot water against the carcasses.

In such a machine the two hind legs and the whole pig carcass can be treated in substantially uniform manner, by which the aforesaid drawbacks are avoided. Preferably, the path of movement is substantially horizontal. In a preferred embodiment according to the invention there are means adapted to rotate the carcasses about their longitudinal axes while they are advanced by the conveyor.

When the carcass is rotated and pressed against the conveyor by its weight, its surface will be subjected to treatment in the form of a message so that hair and fat are removed and give access to the skin for the jets of water, which owing to the rotation of the carcass strike all parts of the surface of the carcass at varying angles.

An essential feature of a espcially preferred embodiment of the invention is that it has conveying means adapted to carry and move the pig carcasses in their lying position along a substantially horizontal path through the air beneath a row of shower means for hot water, parallel with the said path, and rotating means adapted to cause the carcasses to rotate about their longitudinal axes during their substantially horizontal movement; preferably, the conveying means constitute a conveyor adapted to be moved along a substantially horizontal path beneath the showering means and having elements adapted to cause the carcasses to rotate about their longitudinal axes while they are being advanced.

To save water and heat re-circulation of the water will genearlly be used, which, however, involves the risk of the shower means being clogged by foreign substances, for example hoofs and hair. Re-circulation will therefore not be possible without special measures being taken. It will be a simple measure to avoid narrow sectional areas of flow in the shower means, and this is accomplished by the invention thereby that an endless conveyor band is formed of a number of drums and some smaller drums arranged above the larger drums and spaced at a distance apart that is larger than the diameter of the latter in addition to which there is provided a substantially vertical deflecting plate transversely of the direction of movement of the conveyor. It has been found that the bodies of water jets obtained by this embodiment are eminently suitable and that the bore of the discharge pipe may be comparatively large.

BRIEF DESCRIPTION OF THE DRAWING

Various embodiments of a machine according to the invention will now be described with reference to the drawing, in which FIG. 5 is an end view of the machine, looking from the right of FIG. 1, on a larger scale, and FIG. 6 is a schematic representation of a modified embodiment of a carcass support.

DESCRIPTION OF THE PREFERRED EMBODIMENTS

The machine has a frame 1 on which is carried an endless conveyor consisting of a plurality of horizontal drums 2 spaced at such distance apart that a pig carcass 3 may rest in the gap between the two drums and be brought into a rotary movement by friction owing to the rotation of the drums; the carcasses remain in the said gap during the horizontal movement of the upper run of the conveyor from one end of the machine to the other. The opposite ends of the drums 2 have shafts which are rotatably carried in two horizontally spaced apart endless chain means 2a.

Figure 2:
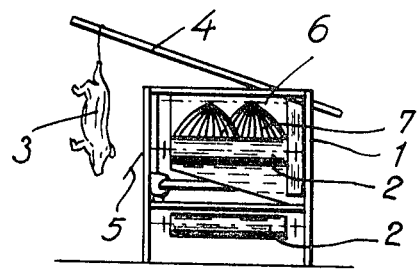
FIG. 2 is an end view of the same.

FIG. 2 indicates schematically how a pig carcass 3 is introduced into the machine. The carcass is suspended in usual manner by its hind leg from a conveyor 4 which has an inclined part, down which the hook carrying the carcass is sliding. As a result, the head of the carcass will strike against a contact surface 5 which retains the head by which the body owing to the movement of the hook is deposited in lying position on the drums 2 at one end of the conveyor. At the other end of the conveyor the carcasses are removed by some suitable device not shown and not described.

Above the upper run of the conveyor are provided a row of shower devices 6 from which emanate water jet elements 7 striking the pig carcasses at any conceivable angle, the said carcasses rolling, as mentioned, on the rotating drums. Thus, each carcass is rotating about its longitudinal axis, but remains in the same space between two drums 2 during the movement of the latter from one end of the machine to the other.

The shower water falls into a trough arranged between the two runs of the conveyor and divided into several chambers 8 by means of partitions 9. The machine is thereby divided into several zones, each comprising a chamber 8 and corresponding shower means arranged thereabove. In each zone there are pipes 9' and a pump 10, and these are adapted in such manner that the water entering the chamber 8 from the conveyor is passed up to the shower means in the zone involved.

Figure 1:
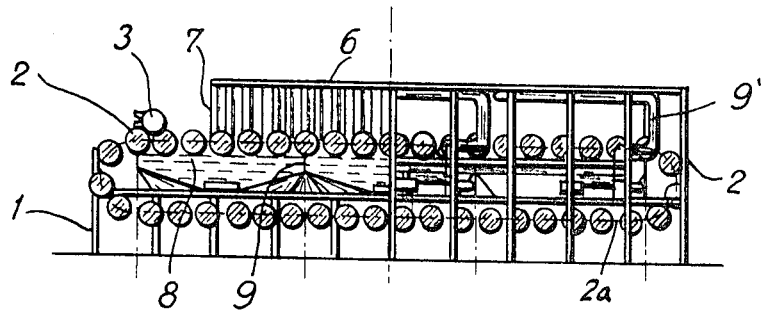
FIG. 1 is a schematic representation of the machine, viewed from the side, with some parts being omitted for the sake of clarity.
Figure 3:
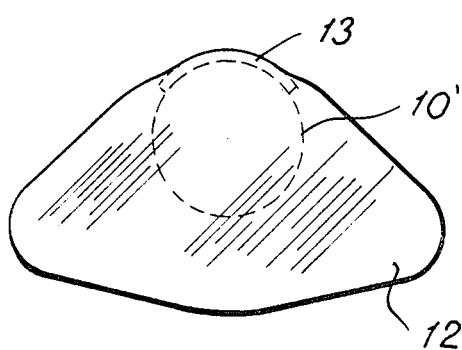
FIG. 3 is an end view of a shower device.
Figure 4:
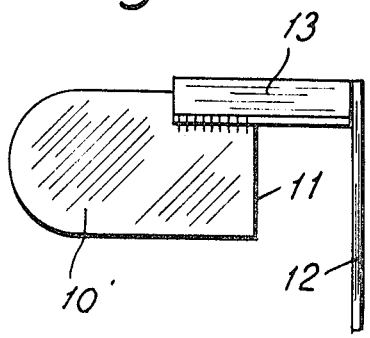
FIG. 4 is the same as FIG. 3, viewed from the side.

The shower devices are illustrated in FIGS. 3 and 4, and each of these devices consists of a horizontal discharge pipe 10' having an open end 11. At some distance in front of same is provided a vertical deflecting plate 12 of substantially triangular form. The deflecting plate 12 is mounted on the discharge pipe 10' by means of a plate 13 connecting the upper part of the deflecting plate with the upper side of the pipe. When the water is pumped through the discharge pipe 10' and out through its open end, the water will be forced against the deflecting plate 12 and be deflected by same as a fan-shaped body of water jets as illustrated in FIGS. 1 and 2.

The said plurality of fan-shaped bodies of jets, arranged one behind the other, gives a highly effective treatment of the surfaces of the carcasses, since the water is supplied at rather heavy pressure and is rather concentrated so that it is capable of washing fat and hairs away from the hair follicles, which have been made partly accessible in advance by the massaging effect exerted upon the surface of the carcass by the drums when the carcass is rotating on these. The risk of the shower means being clogged is eliminated, since there are no narrow openings.

In the embodiment disclosed each drum 2 has as indicated in FIG. 5 at either end a chain wheel 14 which in the upper horizontal run of the conveyor is in engagement with a horizontal chain 15 which is attached to the frame and acts as a rack serving to cause the drums to rotate about their axis. The drums may, however, also be rotated by rolling on a smooth path, by which chain wheels 14 and the chain 15 may be dispensed with. The whole drive of the conveyor is effected by means of an endless chain 16a passed over chain wheels 16 and having a horizontal part in engagement with three of the chain wheels 14. The chain wheels 16 are rotated through chains 17 from a horizontal shaft 18 which is driven by a driving motor 19.

In the embodiment according to FIG. 6 some smaller drums 20 are mounted above and moving together with the drums 2, and all rotating about their longitudinal axis in the same direction as the drums 2. The drums 20 counteract any tendency of the pig carcasses to move in the longitudinal direction of the drum conveyor. The drums 20 may be rotated by means corresponding to those described with reference to the drums 2.

In the embodiment described the conveying means move together with the pig carcasses beneath the shower devices, but the invention also comprises embodiments in which the conveying means as a whole are stationary, whereas the carcasses are moved in relation thereto.

I claim:
1. A machine for scalding pig carcasses comprising: a plurality of supporting means for supporting each pig carcass independently from below in a horizontal position and movable in a first mode along a horizontal path and movable in a second mode to rotate the respective carcass about its longitudinal axis; drive means for moving said supporting means in said first mode along said horizontal path; means for moving each of said supporting means in said second mode as it moves along said path so as to rotate the respective pig carcass; and hot water spraying means mounted above and along said path for spraying all sides of the pig carcasses as they are rotated and conveyed along said path.

2. A machine as in claim 1 wherein each said supporting means includes a pair of parallel, horizontal, spaced-apart rollers rotatably supported by a pair of endless members.

3. A machine as in claim 2 wherein said means for moving said supporting means in said second mode includes fixed means for engaging said rollers as the latter move along said path to thereby impart rotation to the rollers.

References Cited
UNITED STATES PATENTS

| | | | |
|---|---|---|---|
| 1,852,405 | 4/1932 | Farley | 17—11.2UX |
| 1,932,827 | 10/1933 | Morris et al. | 17—11.2UX |
| 2,820,246 | 1/1958 | Thomas | 17—15 |

LUCIE H. LANDENSLAGER, Primary Examiner